US007194207B2

(12) United States Patent
Rasala et al.

(10) Patent No.: US 7,194,207 B2
(45) Date of Patent: Mar. 20, 2007

(54) WIDE-SENSE WAVELENGTH DIVISION MULTIPLEXED (WDM) CROSS-CONNECT DEVICE

(75) Inventors: April Patricia Rasala, Newton, MA (US); Gordon Thomas Wilfong, Gillette, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1097 days.

(21) Appl. No.: 09/779,315

(22) Filed: Feb. 8, 2001

(65) Prior Publication Data

US 2007/0025733 A1 Feb. 1, 2007

(51) Int. Cl.
*H04J 10/00* (2006.01)

(52) U.S. Cl. ............................ 398/48; 398/82; 398/79; 398/50; 385/17

(58) Field of Classification Search ................. 398/48, 398/82, 79, 50; 385/17
See application file for complete search history.

(56) References Cited

U.S. PATENT DOCUMENTS 5,457,556 A * 10/1995 Shiragaki ..................... 398/50
6,226,111 B1 * 5/2001 Chang et al. .................. 398/9
6,333,799 B1 * 12/2001 Bala et al. ...................... 398/9
6,335,992 B1 * 1/2002 Bala et al. ..................... 385/17
6,362,905 B1 * 3/2002 Fukashiro et al. ............ 398/82
6,487,332 B1 * 11/2002 Rasala et al. ................. 385/17
6,532,090 B1 * 3/2003 Doerr et al. .................. 398/82
6,535,310 B1 * 3/2003 Rasala et al. ................. 398/79
6,606,427 B1 * 8/2003 Graves et al. ................ 385/17
2003/0002106 A1 * 1/2003 Takahashi et al. .......... 359/128

* cited by examiner

*Primary Examiner*—David C. Payne

(57) ABSTRACT

The present invention provides a wide-sense, non-blocking WDM cross-connect that utilizes a relatively small number of wavelength interchangers. The cross-connect of the present invention comprises first, second and third fabrics and one or more wavelength interchangers that interconnect the first and second fabrics. Demands that require a change in wavelength are routed through the first fabric, through one or more of the wavelength interchangers, and through the second fabric. Demands that do not require a change in wavelength are only routed through the third fabric. A routing algorithm is utilized to ensure that any sequence of connection requests and withdrawals can be routed without disturbing any currently routed requests.

17 Claims, 2 Drawing Sheets

WIDE-SENSE WAVELENGTH DIVISION MULTIPLEXED (WDM) CROSS-CONNECT DEVICE

TECHNICAL FIELD OF THE INVENTION

The present invention relates to communications and, more particularly, to a wavelength division multiplexed (WDM) cross-connect device for use in optical networks.

BACKGROUND OF THE INVENTION

A wavelength division multiplexed (WDM) cross-connect device, hereinafter referred to as a WDM cross-connect, is a network of fibers connected to various optical components that allow a set of input fibers to be connected to a set of output fibers. Each fiber in the network can support some fixed number n of wavelength channels. In other words, at any time there can be up to n signals along a fiber with each signal using a distinct wavelength. WDM cross-connects are capable of performing wavelength interchanging by connecting a wavelength channel on an input fiber to a different wavelength channel on an output fiber. WDM cross-connects comprise components that are capable of switching an incoming wavelength channel onto any different wavelength channel on an outgoing fiber. These components are commonly referred to as wavelength interchangers.

Another type of component comprised by WDM cross-connects is known as an optical switch. An optical switch has an arbitrary number of fibers passing into it and out of it and any wavelength channel on any incoming fiber can be switched to the same wavelength channel on any outgoing fiber, assuming the wavelength channel is not already being used. The WDM cross-connect also comprises optical fibers that are connected to the optical switches and to the wavelength interchangers at nodes. The optical fibers provide directed paths through the WDM cross-connect in the sense that the signal on any optical fiber only travels in a forward direction through the cross-connect and can never meet itself.

When a request for a connection in a WDM cross-connect is made, the WDM cross-connect must perform two fundamental tasks. First of all, a route or path must be found in the WDM cross-connect from the requested input fiber to the requested output fiber. Secondly, for each fiber in the route, an unused wavelength channel must be assigned so that (1) the wavelength channels assigned on the input and output fibers are the requested wavelength channels, and (2) the wavelength channels assigned on any two consecutive fibers in the route are the same, unless there is a wavelength interchanger connecting the two consecutive fibers.

WDM cross-connects have been proposed that have "non-blocking" properties. The term "non-blocking" corresponds to the ability of the WDM cross-connect to satisfy requests for connections, i.e., the requests are not "blocked" as a result of an unavailable route or wavelength channel. Some of these WDM cross-connects are rearrangeably non-blocking, which means that satisfying requests for new connections may require changing the paths and/or the wavelength channels of already-configured connections. In a WDM cross-connect, disrupting connections in order to create new connections is undesirable since doing so requires buffering of the connections that are to be rearranged.

A WDM cross-connect is considered to be pathwise rearrangeably non-blocking in cases where connection requests can be routed through the cross-connect, but any additional requests received after routing the original set of requests may require some of the previously routed requests to be re-routed. Some WDM cross-connects are considered to be pathwise wide-sense non-blocking. These WDM cross-connects employ a routing algorithm that enables any sequence of connection requests and withdrawals to be satisfied without disturbing any of the currently routed requests. Pathwise strictly non-blocking cross-connects are known that enable any set of requests to be routed through the cross-connect without disturbing the routes associated with previous requests.

A request for a connection requires not only a route from the input fiber to the output fiber, but also a wavelength channel assignment along the route that only changes wavelength channels at wavelength interchangers and that begins and ends on the requested wavelength channels. These requests for connections between wavelength channels on input and output fibers are commonly referred to as demands. When a demand is made following a previously routed demand, the routes and/or the wavelength channel assignments associated with the previously routed demands may need to be changed. The definitions of wavelength rearrangeably non-blocking, wavelength wide-sense non-blocking and wavelength strictly non-blocking are analogous to the definitions provided above for pathwise rearrangeably non-blocking, pathwise wide-sense non-blocking and pathwise strictly non-blocking, respectively.

A WDM cross-connect that is both pathwise and wavelength wide-sense non-blocking will be referred to hereinafter as a wide sense non-blocking WDM cross-connect. Although WDM cross-connects are known that are wide sense non-blocking WDM cross-connects, known designs require a relatively large number of wavelength interchangers. Since a substantial portion of the costs associated with WDM cross-connects is attributable to the costs of the wavelength interchangers, it would be desirable to provide a wide sense non-blocking WDM cross-connect that utilizes a minimum number of wavelength interchangers.

FIG. 1 is a block diagram of a WDM cross-connect 1 that is commonly referred to as a standard design WDM cross-connect. The fabric 2 between the input optical fibers 3 and the output optical fibers 4 of the WDM cross-connect 1 includes a plurality of nodes (not shown) and a plurality of optical fibers (not shown) that interconnect the nodes. Each of the nodes is comprised of a wavelength granularity switch that switches signals received by the fabric 2 on the input fibers 3 onto selected output fibers 4. The WDM cross-connect 1 comprises a controller 6 that controls the operations of the fabric 2 and of the wavelength interchangers 5. The controller 6 causes the wavelength granularity switches to select an appropriate output fiber 4 so that the wavelength of the signal routed onto the output fiber 4 will not be the same as the wavelength of a signal that already exists on the output fiber 4.

The WDM cross-connect 1 comprises k wavelength interchangers 5, where k is a positive integer equal to the number of input fibers 3 and output fibers 4. Each wavelength interchanger 5 is connected to a single input fiber 3. Each input fiber 3 is capable of simultaneously carrying signals at n wavelengths, $\lambda_1$ through $\lambda_n$, where $\lambda$ denotes wavelength and n is a positive integer. Therefore, each input fiber supports n wavelength channels. Each of the wavelength interchangers 5 is capable of permuting the wavelength of a signal on the input fiber 3 to a different wavelength. The fabric 2 then causes the signal to be routed onto a selected output fiber 4. The controller 6 controls the selection of the wavelength channels by the wavelength interchangers 5.

FIG. 2 is a block diagram of a WDM cross-connect 7 that is commonly referred to as a modified standard design WDM cross-connect. The WDM cross-connect 7 is a modification of the design shown in FIG. 1 and includes a wavelength interchanger 8 connected to each of the output fibers 4. The WDM cross-connect 7 comprises 2k wavelength interchangers. The additional wavelength interchangers 8 connected to the output optical fibers 4 enable the wavelength channel utilized by a signal on any of the output optical fibers 4 to be permuted. This enables demands to be handled that specify a particular output wavelength, which is not the case with the WDM cross-connect 1 shown in FIG. 1.

The additional wavelength interchangers 8 provide the WDM cross-connect 7 with improved versatility. However, 2k wavelength interchangers are utilized by the WDM cross-connect 7, which significantly increases the cost of the cross-connect in comparison to the cost associated with the cross-connect shown in FIG. 1. The cross-connects 1 and 7 are, at best, rearrangeably non-blocking and require a large number of wavelength interchangers.

Accordingly, a need exists for a wide-sense non-blocking WDM cross-connect design that minimizes the number of wavelength interchangers that are needed to provide the WDM cross-connect with wide-sense, non-blocking properties.

SUMMARY OF THE INVENTION

The present invention provides a wide-sense, non-blocking WDM cross-connect that utilizes a relatively small number of wavelength interchangers. The cross-connect of the present invention comprises first, second and third fabrics and a controller that performs a routing algorithm. The controller is in communication with each of the fabrics and with the wavelength interchangers and performs a routing algorithm that ensures that any sequence of connection requests and withdrawals can be routed without disturbing any currently routed requests.

The first and second fabrics are interconnected by the wavelength interchangers and by optical fibers, which connect wavelength interchangers to the first and second fabrics. The first fabric receives input fibers, each of which is capable of simultaneously carrying multiple signals at different wavelengths, and has output optical fibers that connect output ports of the first fabric to the wavelength interchangers. The second fabric has input ports that are connected to the wavelength interchangers by input optical fibers. Output ports of the second fabric are connected to output optical fibers of the second fabric, each of which are capable of simultaneously carrying multiple signals at different wavelengths.

The third fabric is connected to the input optical fibers of the first fabric and to the output optical fibers of the second fabric. For any signals carried on the input optical fibers of the first fabric that do not require a change in wavelength, these signals are routed through the third fabric. Since the wavelengths of these signals do not require a change in wavelength, no wavelength interchangers are required to process these signals. Therefore, by using this third fabric to route signals that do not require a change in wavelength, the overall number of wavelength interchangers required by the WDM cross-connect to render it wide-sense, non-blocking is decreased.

These and other features and advantages of the present invention will become apparent to those skilled in the art from the following description, drawings and claims.

DETAILED DESCRIPTION OF THE INVENTION

Figure 1:
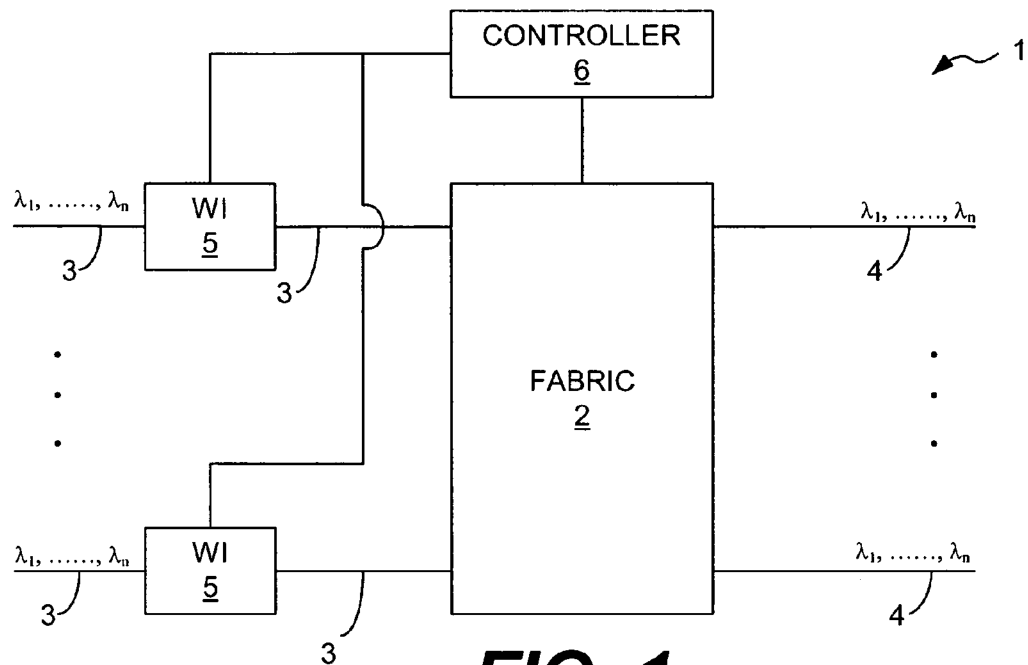
FIG. 1 is a block diagram of a WDM cross-connect that is known as a standard design cross-connect.
Figure 2:
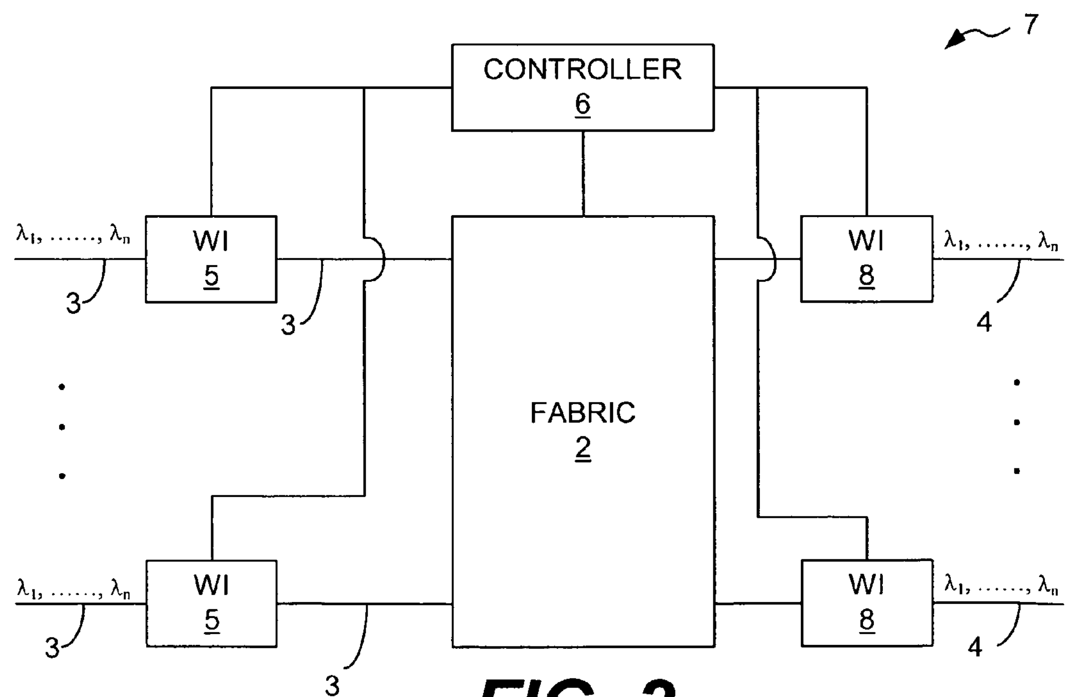
FIG. 2 is a block diagram of a WDM cross-connect that is known as a modified standard design cross-connect.

Prior to describing the WDM cross-connect of the present invention, the variables that are typically used to describe the properties of a WDM cross-connect will be defined. A detailed discussion of the WDM cross-connect of the present invention will then be provided, which will include a proof that utilizes these variables and that demonstrates the wide-sense, non-blocking nature of the WDM cross-connect of the present invention.

A $k \times k$ WDM cross-connect that supports $n>1$ wavelengths may be defined as a directed acyclic graph $C=(V, A, \Lambda)$ where V is the set of nodes, A is the set of arcs between the nodes, $\Lambda=\{\lambda_1, \lambda_2, \ldots, \lambda_n\}$ is the set of available wavelengths, and k is an integer equal to the number of input and output fibers. An arc is typically viewed as corresponding to a fiber having a single direction along which signals are permitted to flow. The node set V is partitioned into four subsets, namely, the set of input nodes, I, the set of output nodes, O, the set of optical switches, S, and the set of wavelength interchangers, W. Sets I and O each contain k nodes. Each node in the set I has an indegree of 0 and an outdegree of 1 whereas each node in set O has an outdegree of 0 and indegree of 1. An arc directed out of a node in set I corresponds to an input fiber and an arc directed into a node in set O corresponds to an output fiber. A node in set W has an indegree 1 and an outdegree 1 whereas the indegree and outdegree of a node in set S are unconstrained, although in current practice they are likely to have an input degree and an output degree equal to 2.

The topology of a cross-connect as given by the directed acyclic graph is typically referred to as the fabric of the cross-connect. However, this definition of the fabric assumes that the wavelength interchangers are part of the fabric. In accordance with the present invention, the fabric is considered to be separate from the wavelength interchangers. Therefore, in accordance with the present invention, the fabric should be considered as including the optical switches, the optical fibers and the nodes, which correspond to the locations where the optical fibers connect to the optical switches. It should be noted that this definition of the fabric is being used herein for illustrative purposes to describe the various aspects of the present invention.

A demand, d, is defined as a 4-tuple (w, x, y, z), where w is an input node, x is a wavelength, y is an output node and z is a wavelength. The wavelengths x and z will be referred to as the input and output wavelengths, respectively. A route, r, in C is a directed path from a node in set I to a node in set O. Along each of the fibers in a route r, one of the n wavelengths is assigned such that consecutive fibers are assigned the same wavelength, unless the common node of the fibers is in set W. A route for a demand d=(w, x, y, z) is a route from input node w to output node y such that, on the corresponding input fiber, the route is assigned wavelength x and on the corresponding output fiber, the route is assigned wavelength z.

A valid demand set is a set of demands that satisfies the following conditions:

(i) for each input node, a, and each wavelength, λ, there is at most one demand with both a as the input node and λ as the input wavelength; and (ii) for each output node, b, and each wavelength, λ, there is at most one demand with both b as the output node and λ as the output wavelength.

A demand set D={$d_1$, $d_2$, . . . , dm} is said to be satisfied by a cross-connect if there exists a set of routes R={$r_1$, $r_2$, . . . , rm} where:

(i) $r_i$ is a route for $d_i$, 1≦i≦m; and (ii) if for some value i≠j, $r_i$ and $r_j$ share some fiber, f, then they must be assigned distinct wavelengths along fiber f.

Such a route set, R, is referred to as a valid routing of the demand set D, and R is said to satisfy D. A wavelength interchanger, $WI_i$, services a particular demand, $d_i$, if the demand $d_i$ is routed through wavelength interchanger $WI_i$.

Figure 3:
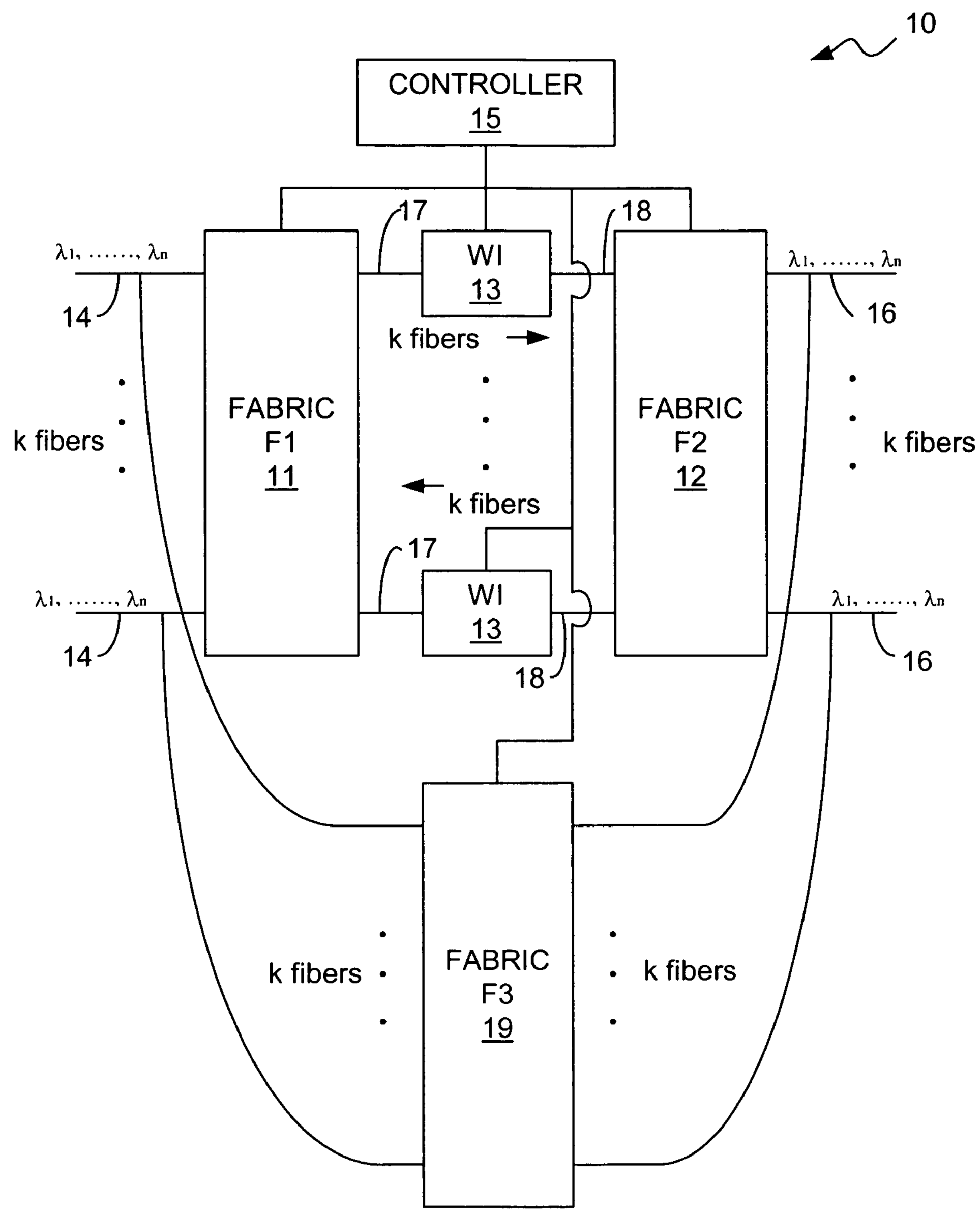
FIG. 3 is a block diagram of the wide sense non-blocking WDM cross-connect of the present invention in accordance with the preferred embodiment.

A discussion of the WDM cross-connect 10 of the present invention will now be provided with reference to FIG. 3. In accordance with the present invention, the fabric of the cross-connect 10 comprises three parts 11, 12 and 19. Parts 11 and 12 are interconnected by one or more wavelength interchangers 13. Part 19 is connected to the input fibers 14 and to the output fibers 16. The three parts 11, 12 and 19 will be referred to hereinafter as fabric F1, fabric F2 and fabric F3. The fabrics F1, F2 and F3 comprise the optical switches and the optical fibers that are connected to the optical switches at nodes of the fabrics. Therefore, the fabrics themselves F1, F2 and F3 can be viewed as not including any devices for changing the wavelength of any signal.

The operations of the WDM cross-connect 10 are controlled by the controller 15, which may be, for example, a microprocessor programmed with appropriate software to execute the routing algorithm of the present invention. Each of the fabrics F1, F2 and F3 can be any WDM cross-connect fabric that has a topology of any wide-sense or strictly non-blocking cross-connect. For example, each cross-connect could have a cross-bar design. Any demand whose input and output wavelengths differ will be routed through F1 11 to some wavelength interchanger 13 and then through F2 12. Any demand whose input and output wavelengths are the same will be routed from a corresponding input optical fiber 14 of the first fabric F1 11 through fabric F3 19 and output onto an output optical fiber 16 of fabric F2 12.

Since F1, F2 and F3 can be based on standard wide-sense, non-blocking cross-connects, known algorithms A1, A2 and A3 exist for routing through F1, F2 and F3, respectively. Therefore, the routing algorithm of the present invention will only need to determine which wavelength interchanger 13 to route a demand through or which demand is to be routed through fabric F3 19. The algorithms A1 and A2 and A3 may then be used as subroutines to route demands through the fabrics in the WDM cross-connect 10.

Since full wavelength interchangers (i.e., devices that can change the wavelength of all signals entering it) are currently, and are likely to remain, complicated and expensive devices, simpler devices that permit wavelength interchange amongst only a small number of wavelengths are of interest. Thus, the problem of designing optimal wide-sense, non-blocking WDM cross-connects for the case where there are only two or three available wavelengths will now be discussed. In order to demonstrate the concepts of the present invention, it will be shown that a wide-sense WDM cross-connect can be designed that uses fewer wavelength interchangers than would be required for a similar strictly non-blocking WDM cross-connect.

Showing that the WDM cross-connect of the present invention is a wide-sense, non-blocking WDM cross-connect can be demonstrated by showing that there is a wavelength interchanger available for any new demand. First, it is assumed that the WDM cross-connect comprises 2k−1 wavelength interchangers 13 and that new demand d exists of type (x, y). When this demand is made, there can be, at most, k−1 existing demands using input wavelength x and k−1 other existing demands using output wavelength y. In the worst case, therefore, each demand uses its own wavelength interchanger. This means that there are, at most, 2k−2 wavelength interchangers that are blocked from servicing the new demand. Therefore, if the WDM cross-connect 10 comprises 2k−1 wavelength interchangers, then there must be one that can service the new demand. This is true even if the WDM cross-connect 10 does not use any algorithm for routing the demands. This gives rise to the question of whether or not fewer than 2k−1 wavelength interchangers can be used if an algorithm is used to route the demands, which would enable the wavelength interchangers to be used more wisely.

In accordance with the present invention, it has been determined a k×k wide-sense, non-blocking WDM cross-connect can be designed that utilizes only 2 wavelengths (i.e., colors) and which requires only k wavelength interchangers. At least k wavelength interchangers are required since k demands that each require a change from a wavelength $\lambda_1$ to a wavelength $\lambda_2$ could occur. Therefore, each demand would need its own wavelength interchanger. Similarly, since, in the present example, there are only two types of demands (i.e., those that change from $\lambda_1$ to $\lambda_2$ and those that change from $\lambda_2$ to $\lambda_1$), each of k wavelength interchangers could service one of each type of such demands. That is, any routing algorithm that routes any demand whose input and output wavelengths differ through any of the available wavelength interchangers, and that routes any demand whose input and output wavelengths are the same through F3, is a routing algorithm that will always succeed. Thus, for a k×k WDM cross-connect, k wavelength interchangers are both necessary and sufficient for the case of 2 colors (i.e., 2 wavelengths).

It will now be shown that a routing algorithm can be used that ensures using 8k/5 wavelength interchangers in a cross-connect of the design shown in FIG. 3 will result in a wide-sense, non-blocking WDM cross-connect in the case where there are three wavelengths. It is assumed here that three wavelengths are r, g and b are used. It will be shown that if express routes exist, which means that if there is a (r, r), (b, b) or (g, g) demand, then the WDM cross-connect 10 can route these demands without using a wavelength interchanger. The manner in which a determination can be made as to an upper bound on the number of wavelength interchangers that are needed for a wide-sense, non-blocking k×k cross-connect will now be discussed.

Demands of type (b, g), (g, r) and (r, b) will be defined herein as Class A demands and demands of type (g, b), (r, g) and (b, r) will be defined herein as Class B demands. The phrase class(d)=A is used herein to indicate that demand d is a class A demand. The phrase class (d)=B is used herein to indicate that demand d is a class B demand. Constraints $C_A$ and $C_B$ are defined to mean that there are fewer than 7k/5 wavelength interchangers that service a class A demand and 7k/5 wavelength interchangers that service a class B demand, respectively. This assumes that there are only 8k/5 wavelength interchangers available in the WDM cross-connect 10.

The motivation for defining constraints $C_A$ and $C_B$ is to demonstrate that, if there is a wavelength interchanger that is servicing class A demands, then it can be used to serve new class A demands (i.e., demands of a type other than those it is already servicing). However, if these were the only constraints considered, problems relating to withdrawals might not be handled. Stating the problem this way requires the re-use of wavelength interchangers already servicing the same class of demands (as desired), while avoiding problems that might result from withdrawals.

Thus, the proof is as follows: Letting W (x, y) be the set of wavelength interchangers that service a type (x, y) demand, x, y$\in${r, b, g} and letting w(x, y)=|W(x, y)|, constraints C((x, y), (y, z)), where x, y, z$\in${b, r, g}, are defined as $$C((x, y), (y, z)): w(x, y)+w(y, z)-|W(x, y)\cap W(y, z)|\leqq 6k/5.$$

Such a constraint requires that the number of wavelength interchangers that service a type (x, y) demand and/or a type (y, z) demand is no more than 6k/5. Six kinds of these constraints exist.

The motivation for the C((x, y), (y, z)) constraints is that when it is desired to insert a new type (x, z) demand, it can be blocked by other type (x, z) demands, namely, by type (x, y) demands or type (y, z) demands. Thus, if there are, at most, 6k/5 total of the latter two blockages, then there can be at most 2k/5 remaining type (x, z) demands, which would need, at most, 8k/5 wavelength interchangers to handle them.

Demands d1 and d2 are said to be mirror opposite demands if d1 is a type (x, y) demand and d2 is a type (y, x) demand, where x is one of r, b, or g and y is one of r, b, or g, but x and y are not the same. In order to prove that this constraint can be maintained as new demands are added (or withdrawn), an additional kind of constraint will be considered. Letting E({g, r}) be the number of wavelength interchangers that are servicing mirror opposite demands of the type (g, r) and (r, g), letting E({b, g}) be the number of wavelength interchangers servicing mirror opposite demands of type (g, b) and (b, g), and letting w be the number of wavelength interchangers servicing mirror opposite demands of type (b, r) and (r, b), a constraint T({g, r}, {b, g} can be defined as E({g, r})+E({b, g})$\leqq$4k/5. For the other pairs of mirror demands, analogous constraints can be defined.

Then, the routing algorithm of the present invention is as follows: Route any new demand so that all constraints mentioned above are maintained. It will now be proven that such a set of constraints can always be maintained. That is, it will be shown that a routing algorithm can be created that will always be able to find a routing that does not violate any of the constraints. It will now be shown that these constraints can always be maintained when new demands are presented. Throughout this proof, it will be assumed that a given a type (b, g) demand d is to be inserted.

Let A be the set of wavelength interchangers that service a type (g, r) demand but no other class A demand, B be the set of wavelength interchangers that service a type (r, b) demand but not other class A demand, C be the set of wavelength interchangers that service a type (b, g) demand (they can also service other class A demands) and D be the set of wavelength interchangers that service a type (g, r) and a type (r, b) demand but no type (b, g) demand. Define $\alpha$=|A|, $\beta$=|B|, $\gamma$=|C| and $\delta$=|D|.

The $C_A$ constraint could be forced to be violated if $\alpha+\beta+\gamma+\delta=7k/5$ and all these wavelength interchangers are blocked so that the WDM cross-connect 10 is prevented from routing the new type (b, g) demand through them. Then, each wavelength interchanger in A must also be servicing a mirror opposite demand of type (r, g) and every wavelength interchanger B must be servicing a type (b, r) demand. However, for a wavelength interchanger in D to be blocking a type (b, g) demand, it must already be servicing a type (b, g) demand, but this contradicts the definition of D. Thus, $\delta$=0(i.e., D=0).

Every wavelength interchanger in A and C services a demand with output wavelength g (before d is routed) and so $\alpha+\gamma<k$. Every wavelength interchanger in B and C service demands with input wavelength b and so $\beta+\gamma<k$. Also, the total number of wavelength interchangers in A and B is inductively assumed to be bounded to be no more than 4k/5 since it has been assumed that T({g, r}, {r, b}) holds true. That is, $\alpha+\beta\leqq 4k/5$. Adding these three inequalities results in the following:

$$2(\alpha+\beta+\gamma)<14k/5.$$

Therefore, $\alpha+\beta+\gamma<7k/5$, and this contradicts the assumption that $\alpha+\beta+\gamma+\delta=7k/5$ (since $\delta$=0).

Now, it will be shown that the T({g, r}, {b, g}) kind of constraints never need be violated either. Supposing that E({g, r})+E({b, g})=4k/5, and a new type (b, g) demand d must be routed. Supposing there are some available wavelength interchangers that are currently servicing a type (g, b) demand and that T({g, r}, {b, g}) would be violated if demand d is routed through one of them. Thus, these wavelength interchangers can be thought of as being "blocked" from being used for routing d since that would cause the constraint to be violated. It will now be considered what could prevent routing d through some wavelength interchanger other than those servicing a type (g, b) demand.

A wavelength interchanger might be servicing a type (b, r) demand or a type (r, g) demand, and that would block the routing of d through it. Supposing there are a total of s wavelength interchangers blocked by any of these three types of demands. However, all of these types of demands are from class B and it has been shown that there are already 4k/5 wavelength interchangers servicing class B demands (namely, the 4k/5 wavelength interchangers servicing the E({g, r})+E({b, g})=4k/5 mirror opposite demands). Therefore, there are no more than 8k/5−7k/5=k/5 wavelength interchangers unaccounted for so far. Of course, there could be some number, t, of wavelength interchangers blocked by demands of type (b, g) (the same type as d), but since the E({g, r})+E({b, g})=4k/5 wavelength interchangers blocked with mirror opposite demands all have a g output wavelength, it is known that t<k/5, since d also has a g output wavelength. Therefore, less than 8k/5 wavelength interchangers have now been accounted for, and so there must be some wavelength interchanger left over that is not blocked (i.e., either in the usual sense or in the sense that routing d through it would increase the number of wavelength interchangers servicing mirror opposite demands). Therefore, d can be routed through one of these wavelength interchangers.

Now, the question of how the constraint C((b, g), (g, x)) can be violated will be considered. Considering the C((b, g), (g, r)) constraint and supposing that it is about to be violated, the number of wavelength interchangers servicing one or both of these types of demands is 6k/5, and the demand d is blocked from going through any of them. Such wavelength interchangers are either (i) already servicing a type (b, g) demand or, otherwise, (ii) servicing a type (g, r) demand as well as a type (r, g) demand. However, that would mean that there are $6k/5>k$ wavelength interchangers servicing demands with g output. Thus, the set $W_1$ of wavelength interchangers servicing a type (g, r) demand that can also service d must be non-empty. Similarly, considering the case of the other constraint C((b, g), (r, b)) that d might be forced to violate, it is known that the set $W_2$ of wavelength interchangers that are currently servicing a type (r, b) demand that are not blocked from servicing d is also non-empty.

However, the question remains of whether there exists a wavelength interchanger in $W_1 \cap W_2$. Clearly, if there is some wavelength interchanger in D, then it is in $W_1 \cap W_2$. On the other hand, if it is assumed that $\delta=0$ (i.e., D=0), then $\alpha+\gamma=\beta+\gamma=6k/5$ and $\alpha+\beta+\gamma<7k/5$. This implies that $\gamma=k$, but since d has not been routed yet, it is known that $\gamma<k$. More explicitly, $$12k/5=7k/5=5k/5=k$$

and thus $\gamma>12k/5-7k/5=5k/5=k$.

Therefore, it can be seen that the constraints $C_A$ and $C_B$ are relevant, the real work is done by the C((x, y), (y, z)) constraints, which are maintainable by maintaining the T( ) constraints, since if those are maintained, it is never necessary to use more than 8k/5 wavelength interchangers. This is true since, for demand d, at most 6k/5 wavelength interchangers are blocking it that do not service a demand of the same type as d, and at most 2k/5−1 other demands of the same type as d can exist. Therefore, there is always at least one wavelength interchanger available.

The present invention has been described with reference to the preferred embodiments. However, those skilled in the art will understand that the present invention is not limited to the embodiments explicitly described herein. Those skilled in the art will understand that modifications may be made to the embodiments discussed above that are within the scope of the present invention. It will also be understood that the present invention is not limited with respect to the types of components that are used to create the cross-connect 10 of the present invention. Those skilled in the art will understand that a variety of different components may be used to produce the fabrics F1 11, F2 12 and F3 19 and the wavelength interchangers 13. Those skilled in the art will also understand that a variety of different types of controllers may be used for the controller 15 that performs the routing algorithm of the present invention.

What is claimed is:

1. A wide-sense, non-blocking wavelength division multiplexed (WDM) cross-connect device, the device comprising:

a first fabric being adapted to receive a first number of input fibers at an input side of said first fabric, wherein at least one of said input fibers is capable of carrying at least two signals having different wavelengths;

a second fabric being adapted to output signals onto first number of output fibers at an output side of said second fabric, and wherein at least one of said output fibers is capable of carrying at least two signals having different wavelengths;

a third fabric being adapted to be optically coupled on an input side of said third fabric to said input fibers and to be optically coupled on an output side of said third fabric to said output fibers;

at least one wavelength interchanger coupled by optical fibers to an output side of said first fabric and to an input side of said second fabric; and a controller coupled to said first, second and third fabrics and to said at least one wavelength interchanger, the controller being configured to execute a routing algorithm that causes a demand that requires a change of wavelength to be routed through at least one of said at least one wavelength interchanger and that causes demands that do not require a change in wavelength to be routed through said third fabric.

2. The device of claim 1, wherein said first number of input fibers is k, said first number of output fibers is k and wherein the device comprises k wavelength interchangers, k being an integer that is greater than or equal to 1.

3. The device of claim 2, wherein the first, second and third fabrics each comprise at least one optical switch that receives the control signals output by the controller, each optical switch of the first, second and third fabrics being optically coupled by optical fibers to respective input and output ports of the first, second and third fabrics, wherein each optical switch of the first, second and third fabrics causes signals received by the respective optical switches to be routed to output ports of the first, second and third fabrics, respectively, in accordance with control signals received by the optical switches.

4. The device of claim 3, wherein the device is wide-sense non-blocking in terms of both wavelength and routing, and wherein each of said k wavelength interchangers is controlled by control signals received thereby to select a wavelength that a signal received on an optical fiber coupling the output side of the first fabric to the wavelength interchanger is to utilize when the signal is routed by the wavelength interchanger onto an optical fiber coupling the wavelength interchanger to the input side of the second fabric.

5. The device of claim 4, wherein each of said k input fibers is capable of carrying a plurality of signals having different wavelengths, and wherein each of said k output fibers is capable of carrying a plurality of signals having different wavelengths.

6. A wide-sense, non-blocking wavelength division multiplexed (WDM) cross-connect device, the device comprising:

a first fabric being adapted to receive k input fibers at an input side of said first fabric, wherein at least one of said k input fibers is capable of carrying at least two signals having different wavelengths;

a second fabric being adapted to output signals onto k output fibers at an output side of said second fabric, and wherein at least one of said k output fibers is capable of carrying at least two signals having different wavelengths;

a third fabric being adapted to be optically coupled on an input side of said third fabric to said k input fibers and to be optically coupled on an output side of said third fabric to said k output fibers;

k wavelength interchangers coupled by optical fibers to an output side of said first fabric and to an input side of said second fabric; and a controller coupled to said first, second and third fabrics and to said k wavelength interchangers, the controller being logically configured to execute a routing algorithm that causes demands that require a change of wavelength to be routed through at least one of said k wavelength interchangers and that causes demands that do not require a change in wavelength to be routed through said third fabric, and wherein k is an integer that is equal to or greater than 1.

7. The device of claim 6, wherein the first, second and third fabrics each comprise at least one optical switch that receives the control signals output by the controller, each optical switch of the first, second and third fabrics being optically coupled by optical fibers to respective input and output ports of the first, second and third fabrics, wherein each optical switch of the first, second and third fabrics causes signals received by the respective optical switches to be routed to output ports of the first, second and third fabrics, respectively, in accordance with control signals received by the optical switches.

8. The device of claim 7, wherein the device is wide-sense non-blocking in terms of both wavelength and routing, and wherein each of said k wavelength interchangers is controlled by control signals received thereby to select a wavelength that a signal received on an optical fiber coupling the output side of the first fabric to the wavelength interchanger is to utilize when the signal is routed by the wavelength interchanger onto an optical fiber coupling the wavelength interchanges to the input side of the second fabric.

9. A wavelength division multiplexed (WDM) device, the device comprising:

a first fabric having k input ports, each of the input ports being adapted to be optically coupled to an input optical fiber;

a second fabric having k output ports, each of the output ports being adapted to be optically coupled to an output optical fiber;

k wavelength interchangers, each wavelength interchanger having an input port and an output port, each wavelength interchanger being optically coupled at an input port thereof to an optical fiber that is optically coupled to an output port of the first fabric, each wavelength interchanger being optically coupled at an output port thereof to an optical fiber that is optically coupled to an input port of the second fabric; and a third fabric having k input ports and k output ports, each of the input ports of the third fabric being optically coupled directly to a distinct one of the input optical fibers of the first fabric and each of the output ports being optically coupled directly to a distinct one of the output optical fibers of the second fabric.

10. The device of claim 8, further comprising:

a controller coupled to said first, second and third fabrics and to said k wavelength interchangers, the controller being logically configured to execute a routing algorithm that causes demands that require a change of wavelength to be routed through at least one of said k wavelength interchangers and that causes demands that do not require a change in wavelength to be routed through said third fabric, and wherein k is an integer that is equal to or greater than 1.

11. The device of claim 10, wherein the first, second and third fabrics each comprise at least one optical switch that receives the control signals output by the controller, each optical switch of the first, second and third fabrics being optically coupled by optical fibers to respective input and output ports of the first, second and third fabrics, wherein each optical switch of the first, second and third fabrics causes signals received by the respective optical switches to be routed to output ports of the first, second and third fabrics, respectively, in accordance with control signals received by the optical switches.

12. The device of claim 11, wherein the device is wide-sense non-blocking in terms of both wavelength and routing, and wherein each of said k wavelength interchangers is controlled by control signals received thereby to select a wavelength that a signal received on an optical fiber coupling the output side of the first fabric to the wavelength interchanger is to utilize when the signal is routed by the wavelength interchanger onto an optical fiber coupling the wavelength interchanger to the input side of the second fabric.

13. A method for providing a wavelength division multiplexing cross-connect device with wide-sense, non-blocking properties, the method comprising the steps of:

interconnecting a first fabric to a second fabric via k wavelength interchangers, optically coupling an input side of the first fabric to k input optical fibers;

optically coupling an output side of the second fabric to k output optical fibers;

optically coupling said k input optical fibers directly to an input side of a third fabric; and optically coupling said k output optical fibers directly to an output side of said third fabric.

14. The method of claim 13, wherein k is an integer that is greater than or equal to 1.

15. The method of claim 14, further comprising the step of:

configuring a controller with logic to control operations of the first, second, third fabrics and to control operations of said k wavelength interchangers, such that a demand that requires a change in wavelength is routed through the first fabric, through one said k wavelength interchangers and through said second fabric, and such that a demand that does not require a change in wavelength is routed through said third fabric.

16. A computer program for providing a wavelength division multiplexing (WDM) cross-connect device with wide-sense, non-blocking properties, the program being embodied on a computer readable medium, the program comprising:

code for controlling operations of a first, a second, and a third fabric and k wavelength interchanqers of the WDM cross-connect device, the code determining whether or not a demand requires a change in wavelength, wherein if the code determines that a demand requires a change in wavelength, the code causes the demand to be routed through the first fabric, through at least one of said k wavelength interchangers and through said second fabric, and wherein if the code determines that a demand does not require a change in wavelength, the code causes the demand to be routed through said third fabric, and wherein the first fabric is connected to the second fabric via k wavelength interchangers and optical fibers, and wherein k input optical fibers are optically coupled to an input side of the first fabric, and wherein an output side of the second fabric is optically coupled to k output optical fibers, said k input optical fibers being optically coupled to an input side of the third fabric, said k output optical fibers being optically coupled to an output side of said third fabric.

17. The program of claim 16, wherein k is an integer that is equal to or greater than 1.

* * * * *